(12) United States Patent
Huff

(10) Patent No.: US 7,976,619 B2
(45) Date of Patent: Jul. 12, 2011

(54) HYDROCARBON ADSORBER WITH PURGE AIRFLOW CHANNEL

(75) Inventor: Dan Huff, Spruce, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 301 days.

(21) Appl. No.: 12/266,948

(22) Filed: Nov. 7, 2008

(65) Prior Publication Data

US 2009/0120046 A1    May 14, 2009

Related U.S. Application Data

(60) Provisional application No. 60/986,733, filed on Nov. 9, 2007.

(51) Int. Cl.
*B01D 53/04* (2006.01)

(52) U.S. Cl. .......................................... 96/134; 55/385.3

(58) Field of Classification Search ..................... 96/110, 96/134, 135, 147, 152; 55/385.3; 123/198 E, 123/518

See application file for complete search history.

(56) References Cited

U.S. PATENT DOCUMENTS

| | | | | |
|---|---|---|---|---|
| 3,572,013 A | * | 3/1971 | Hansen | 96/138 |
| 3,572,014 A | * | 3/1971 | Hansen | 96/138 |
| 3,646,731 A | * | 3/1972 | Hansen | 96/136 |
| 3,678,663 A | * | 7/1972 | Hansen | 96/141 |
| 6,438,486 B1 | * | 8/2002 | Mancini | 701/104 |
| 6,505,610 B2 | * | 1/2003 | Everingham et al. | 123/516 |
| 6,835,237 B2 | * | 12/2004 | Ishida | 96/135 |
| 7,476,268 B2 | * | 1/2009 | Maier et al. | 96/134 |
| 7,507,279 B2 | * | 3/2009 | Mizutani et al. | 96/135 |
| 7,531,029 B2 | * | 5/2009 | Hoke et al. | 96/134 |
| 7,641,720 B2 | * | 1/2010 | Li | 96/108 |
| 7,758,678 B2 | * | 7/2010 | Yoshida et al. | 96/135 |
| 2002/0124733 A1 | * | 9/2002 | Iriyama et al. | 96/134 |
| 2004/0050252 A1 | * | 3/2004 | Wernholm et al. | 95/143 |

\* cited by examiner

*Primary Examiner* — Frank M Lawrence

(57) ABSTRACT

An air cleaner assembly and an air induction system for an internal combustion engine. The air cleaner assembly preferably is formed using first and second housing members that are assembled to define an interior volume. A hydrocarbon adsorber is located within air induction system, e.g., within the interior volume of the air cleaner assembly. The hydrocarbon adsorber is positioned outside of the main air flow within a recess formed in a wall of one of the housing members. A purge channel is formed in the interior wall that houses the hydrocarbon adsorber. Air flow through the air induction system passes via the purge channel through the hydrocarbon adsorber. By facilitating air flow through the hydrocarbon adsorber that is positioned outside of the main airflow, the hydrocarbon adsorber is self-regenerating and does not have to be replaced over the lifetime of the vehicle as a result of hydrocarbon build-up.

18 Claims, 4 Drawing Sheets

HYDROCARBON ADSORBER WITH PURGE AIRFLOW CHANNEL

CROSS REFERENCE TO RELATED APPLICATIONS

This application claims priority from U.S. provisional patent application No. 60/986,733, filed Nov. 9, 2007, the entire disclosure of which is incorporated herein by reference.

BACKGROUND OF THE INVENTION

The present invention relates to an automotive air cleaner assembly, in particular, an air cleaner assembly having improved adsorber regeneration characteristics.

Recently enacted partial zero emission vehicle (PZEV) standards have encouraged automakers to produce more environmentally friendly vehicles. In order to meet the more stringent emissions requirements, particularly with respect to hydrocarbon emissions, automakers have implemented a number of systems and designs to reduce the emissions both from an engine's exhaust and its air intake. It is known, for example, to incorporate a hydrocarbon adsorber in the air induction system of an engine in order to capture the backflow of hydrocarbons that can occur during engine shutdown. The hydrocarbon adsorber is typically incorporated in the vicinity of a conventional air (particle) filter.

In such air induction systems, hydrocarbons diffusing from the engine can be captured by adsorbent media within the hydrocarbon adsorber thus preventing their release into the environment. The adsorbent media can, in turn, be regenerated during normal engine operation when positive air flow passing through the air induction system entrains the captured hydrocarbons and carries them downstream to the engine where they are combusted.

Automobile engines, including those having a hydrocarbon adsorber, typically include a mass air flow sensor (MAFS). The mass air flow sensor is typically located downstream of the air filter within the air induction system. In order for the mass air flow sensor to provide a measurement having an adequate signal-to-noise ratio, it is preferable that the filter element and its attendant components cause minimal disruption of the air flow reaching the mass air flow sensor.

Prior art hydrocarbon adsorbers, which are typically located directly in the airflow, comprise a mesh or screen that supports the adsorbent media. While such a configuration may reduce the average turbulence in the downstream flow field, it is expensive to manufacture and is susceptible to freezing over during use, which can result in undesired blockage and reduced air flow to the engine.

It is therefore preferable to locate the hydrocarbon adsorber outside of the main air flow. With this geometry, it is possible to minimize both the adsorber's contribution to downstream turbulence and the likelihood that it freezes over during use. One approach to locating the hydrocarbon adsorber outside of the main air flow is to position the hydrocarbon adsorber against an inside wall of the air cleaner assembly. By locating the hydrocarbon adsorber against an inside wall of the air cleaner, however, the air flow that passes through the adsorbent media is reduced, which disadvantageously decreases the efficiency with which trapped adsorbents can be desorbed in order to regenerate the hydrocarbon adsorber.

SUMMARY OF THE INVENTION

It is therefore one object of the invention to provide an air cleaner assembly that includes a hydrocarbon adsorber, wherein the air cleaner assembly is configured to facilitate desorption of hydrocarbons trapped by adsorbent media within the hydrocarbon adsorber.

A further object of the invention is to provide a hydrocarbon adsorber that is located out of the direct path of the airflow through the air cleaner assembly.

A still further object of the invention is to provide an air cleaner assembly comprising a hydrocarbon adsorber that induces minimal downstream turbulence and is not prone to freezing over, but which has efficient loading and purging cycles.

These and other objects and advantages of the invention are achieved by an air cleaner assembly comprising a power purge channel that permits intake air to flow to a backside of a hydrocarbon adsorber that is located against an inner wall of the air cleaner assembly.

In accordance with one aspect of the invention, the objects are achieved by providing an air induction system for an internal combustion engine of a motor vehicle, the system comprising an unfiltered air intake, an air cleaner assembly, a filtered air duct, a mass air flow sensor arranged along the filtered air duct for measuring air flow through the air induction system; a throttle body arranged to regulate air flow through the air induction system, and a hydrocarbon adsorber positioned in the air induction system for absorbing uncombusted hydrocarbons; wherein the hydrocarbon adsorber is positioned out of the main airflow that passes through the air induction system, and the air induction system further comprises a purge channel for directing a portion of the air flow through the air induction system through the hydrocarbon adsorber to purge adsorbed hydrocarbons from the adsorber.

In accordance with yet another aspect of the invention, the objects are achieved by providing an air cleaner assembly comprising an air filter housing comprising a plurality of air filter housing members and having an air filter element disposed therein with an unfiltered air inlet on one side of the air filter element and a filtered air outlet on the other side of the air filter element, whereby air from the unfiltered air inlet must flow through the air filter element to reach the filtered air outlet; the unfiltered air inlet communicating with the unfiltered air intake, and the filtered air outlet communicating with the filtered air duct; and a hydrocarbon adsorber positioned in the air cleaner assembly for absorbing uncombusted hydrocarbons; wherein the hydrocarbon adsorber is positioned out of the main airflow that passes through the air cleaner assembly, and the air cleaner assembly further comprises a purge channel for directing a portion of the air flow through the air cleaner assembly through the hydrocarbon adsorber to purge adsorbed hydrocarbons from the adsorber.

Further preferred embodiments and refinements of the invention are set forth in the following description and/or illustrated in the accompanying drawings.

These and other features of preferred embodiments of the invention, in addition to being set forth in the claims, are also disclosed in the specification and/or in the drawings, and the individual features each may be implemented in embodiments of the invention either individually or in the form of sub-combinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
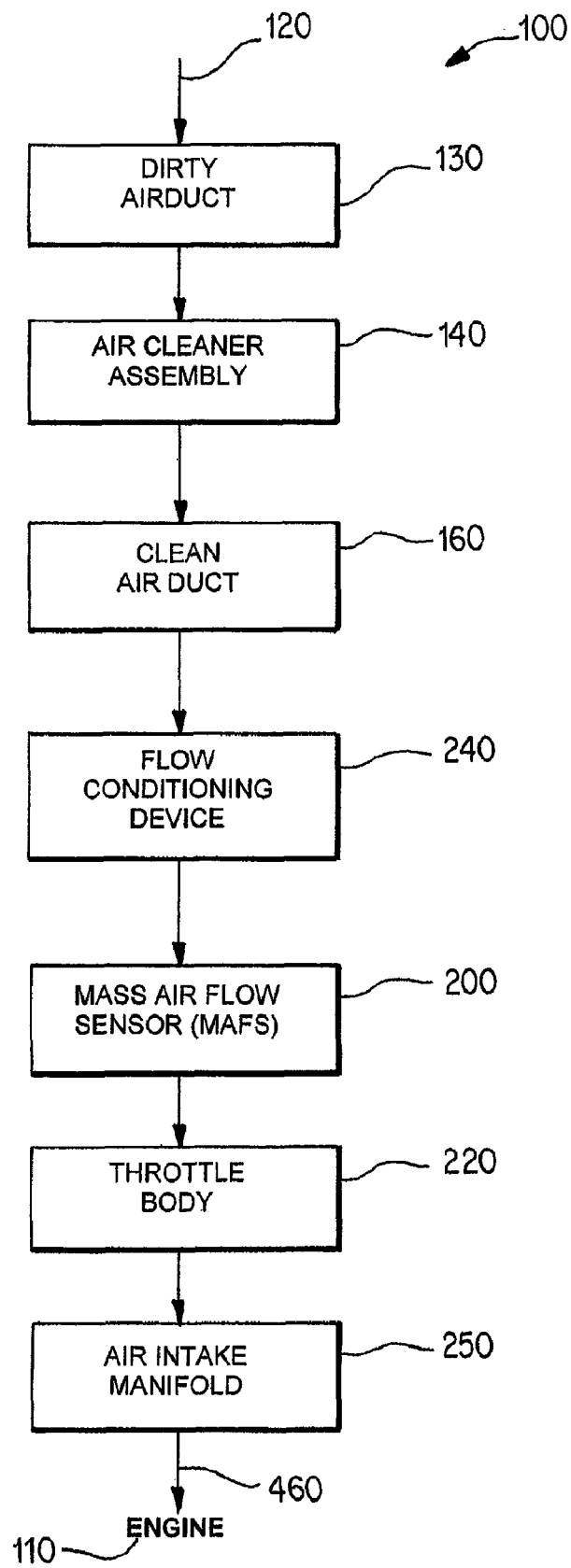
FIG. 1 is a schematic diagram of an air induction system for an internal combustion engine.

Referring to FIG. 1, an air induction system installed in the vicinity of an internal combustion engine 110 of an automobile is shown schematically and represented by reference numeral 100. The air induction system 100 filters and meters the flow of air into the engine 110. The arrows in FIG. 1 indicate the direction of the air flow into the engine.

The air induction system 100 comprises a unfiltered air duct 130, an air cleaner assembly 140, a clean air duct 160, a mass air flow sensor (MAFS) 200, a throttle body 220, and an intake manifold 250 connected to the engine 110. In order to effectively draw air from the environment, the unfiltered air duct 130 may be provided with an air inlet venturi (not shown).

During operation of the engine, ambient air enters the air induction system 100 via the unfiltered air duct 130 and flows through the air cleaner assembly 140, which removes particulate matter from the air before it flows, via the clean air duct, into the engine 110.

The mass air flow sensor 200 is located downstream from the air cleaner assembly 140 and upstream from the throttle body 220, directly in the path of the air flow 120. The air induction system may optionally include a flow conditioning device 240 positioned in the clean air duct 160 upstream from the mass air flow sensor 200 in order to condition the flow of air to the mass air flow sensor.

Figure 2:
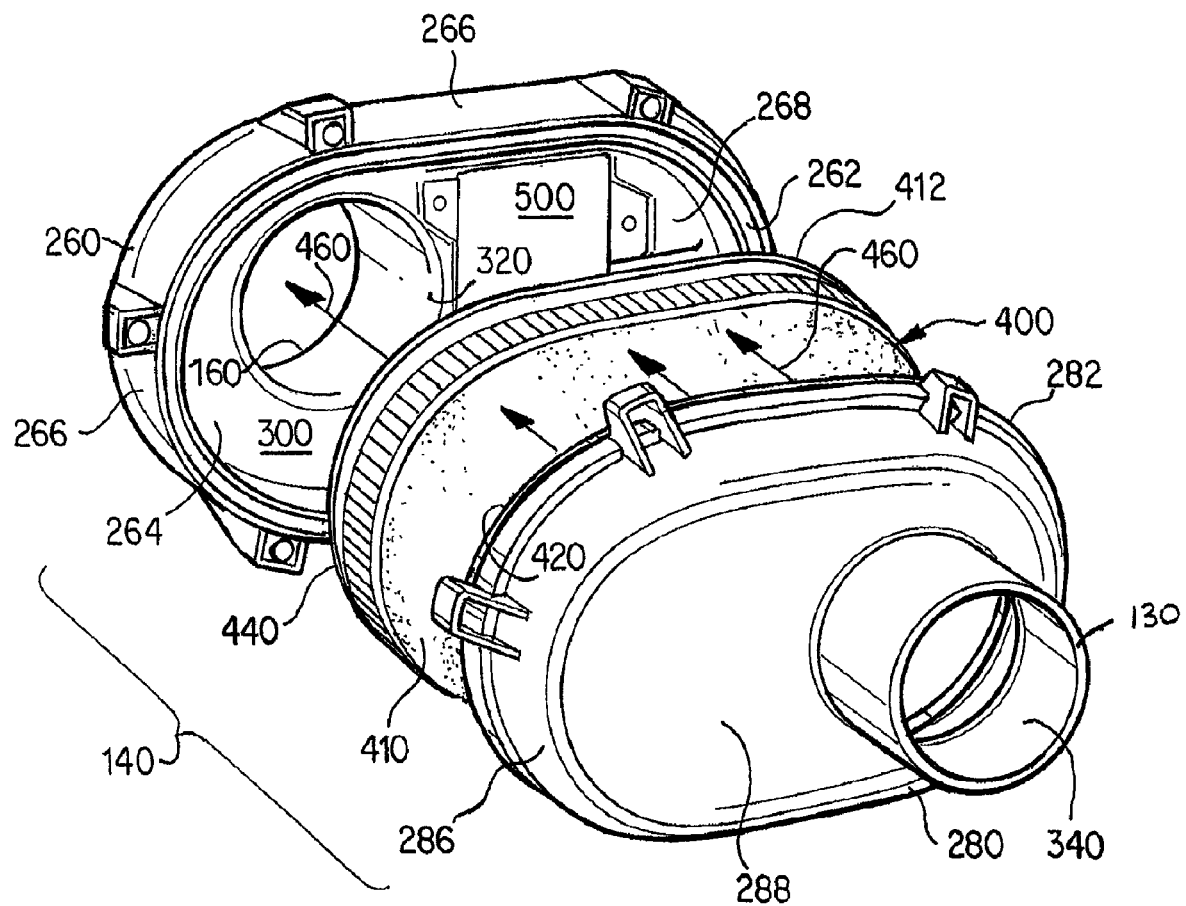
FIG. 2 is an exploded view of an air cleaner assembly according to one embodiment of the invention.
Figure 3:
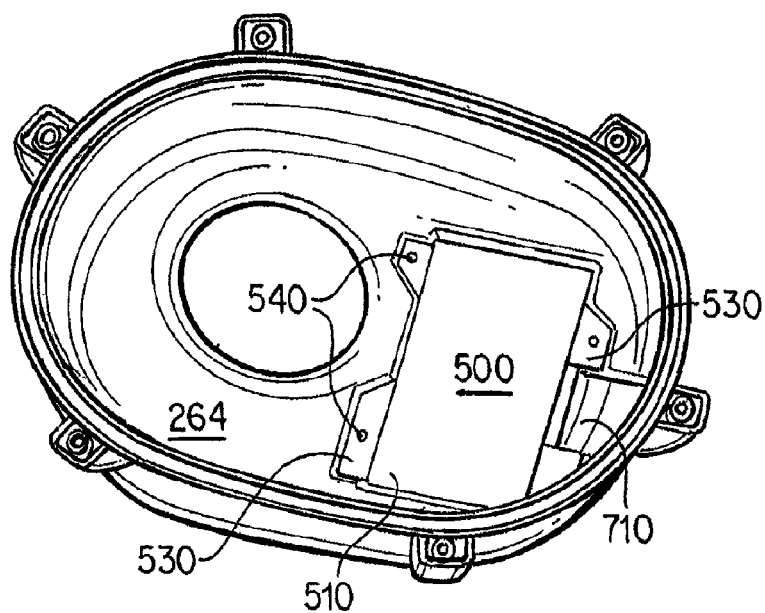
FIG. 3 is a perspective view of a housing member used to form the air cleaner assembly shown in FIG. 2.
Figure 4:
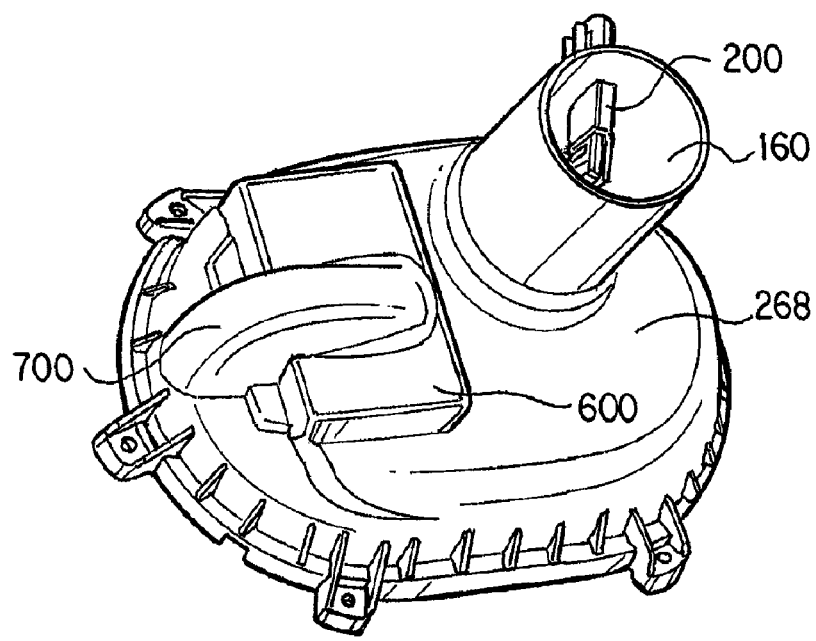
FIG. 4 is a further perspective view of the housing member shown in FIG. 3.
Figure 5:
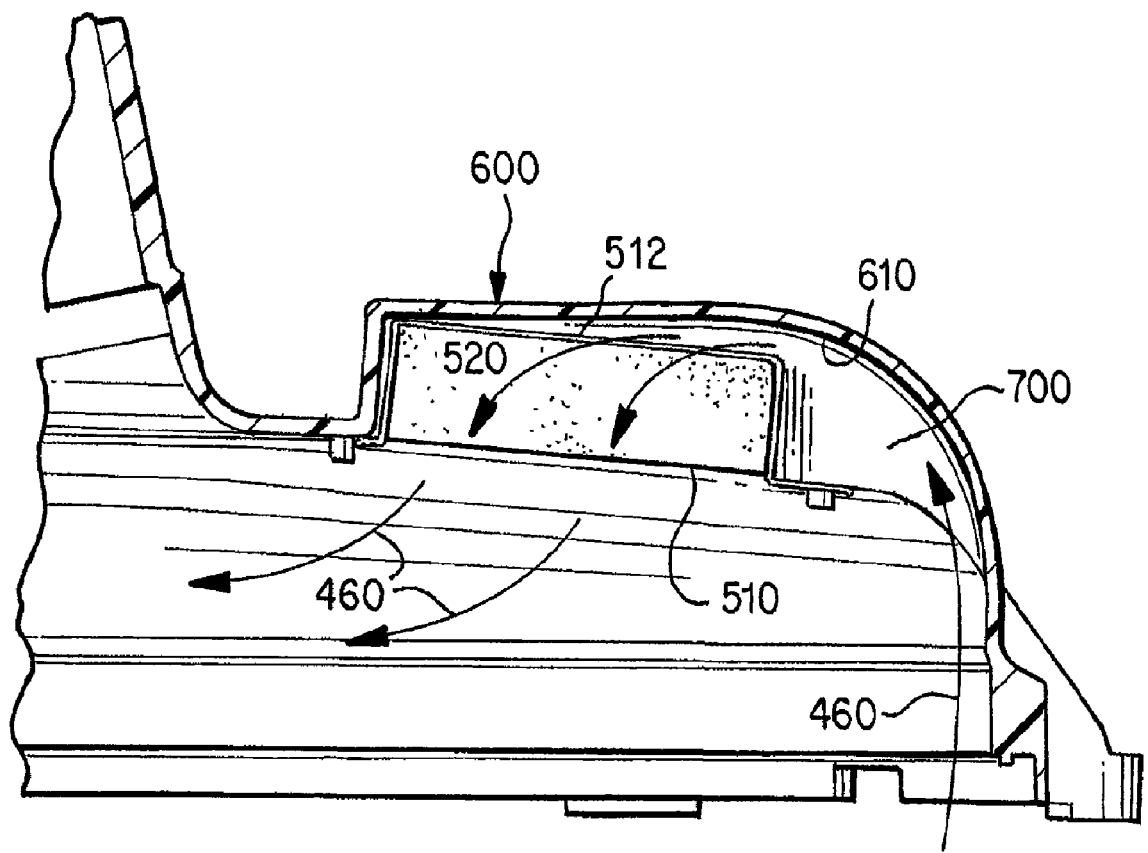
FIG. 5 is a side view of a housing member.

Referring to FIG. 2, the air cleaner assembly 140 preferably comprises a two-piece housing formed from first housing member 260 and second housing member 280. The first housing member 260 and second housing member 280, when assembled along cooperating sealing interfaces 262, 282 define an interior volume 300. First housing member 260 has a clean air port 320 for connecting the clean air duct 160, and second housing member 280 has an unfiltered air port 340 for connecting the unfiltered air duct 130. The two-piece housing is assembled to form a portion of an air cleaner assembly 140 that can be installed within the engine compartment of a motor vehicle, and preferably secured within the engine compartment using an attachment component such as a clamp.

The first housing member 260 and second housing member 280 are preferably made of a synthetic resin material and are sized and shaped to be fitted (e.g., snap-fitted) together along respective sealing interfaces 262, 282. As an alternative to a synthetic resin material, the first housing member and second housing member may be made of a metal or a composite material such as a metal/synthetic resin composite. Exemplary synthetic resins include polyolefins such as polyethylene and polypropylene; polystyrene and other styrenes such as styrene-acrylonitrile copolymer and ABS resins; polyamides such as nylon, polyacetal, polyesters, polyphenylene ether, and polyvinyl chloride. Exemplary metals include aluminum and aluminum alloys.

The first housing member 260 and second housing member 280 can be formed separately by injection molding, and fasteners can be provided for securing the two housing members together. Preferably, the first housing member and second housing member, when secured, form a fluid tight seal that prevents the passage of gases through the seal.

When assembled, the air cleaner assembly 140 includes an air filter element 400, which is disposed within the interior volume 300. Preferably, the air filter element 400 occupies a majority of the interior volume 300. The air filter element 400 functions to remove particulate matter present in the ambient air and divides the interior volume 300 into a unfiltered air portion 420 located upstream from the air filter element 400, and a clean air portion 440 located downstream from the air filter element 400. The clean air exiting the air filter element 400 is preferably substantially free of dirt and dust particles. Typically, the air filter element 400 is a made of porous paper (e.g., corrugated paper).

The air cleaner assembly is configured to permit essentially straight through or axial flow with respect to the air filter element 400. By "straight through flow" is meant that the air flow passes directly through the air filter element 400, entering at an inlet face 410 and exiting at an outlet face 412, such that the direction of the airflow entering the inlet face 410 is substantially parallel to the direction of the airflow exiting at the outlet face 412. Such a configuration advantageously reduces air turbulence downstream from the air cleaner assembly.

The air cleaner assembly according to the invention can be used with any sized engine or engine configuration. For example, the engine may be a 4- or 6-cylinder engine having an in-line geometry or a V-shaped geometry.

Further aspects of the construction of the air cleaner assembly 140 are described next with reference to FIGS. 2-5. As discussed above, the air cleaner assembly 140 is defined by first and second housing members. First housing member 260 is defined by a plurality of sidewalls 266 and by end wall 268, whereby the sidewalls extend between sealing interface 262 and the end wall 268. Likewise, second housing member 280 is defined by sidewalls 286 and an end wall 288. The air cleaner assembly 140 is illustrated as having a substantially oval cross-sectional shape. It is to be understood, however, that the air cleaner assembly may have different cross-sectional shapes, such as square, rectangular, round, oblong or crescent.

Referring to FIGS. 2-5, the clean and unfiltered air ports 320, 340 are formed in respective walls of the first housing 320, 340 member 260 and the second housing member 280. The clean air port 320 and the unfiltered air port 340 are preferably formed in opposing walls and are located so as to be either substantially directly across the interior volume from each other or, as illustrated in FIG. 2, offset with respect to each other in the assembled housing. According to an embodiment, the clean air port 320 and the unfiltered air port 340 are formed in opposing end walls of the housing members. In lieu of forming both the clean air port 320 and the unfiltered air port 340 in the end walls, however, one or both of the air ports can be formed in a sidewall of a housing member.

When the engine is turned on, air drawn from the environment is filtered by the air filter element 400 and clean air flows downstream to the engine. When the engine is switched off, however, un-combusted hydrocarbons can flow upstream from the engine through the air induction system where they may be released to the environment through the unfiltered air duct 130. To prevent hydrocarbons from escaping to the environment, the air cleaner assembly 140 is also provided with a hydrocarbon adsorber 500.

The hydrocarbon adsorber comprises adsorbent media 520 such as carbon, activated carbon, zeolites, or mixtures thereof. The location of the hydrocarbon adsorber 500 within the hollow interior 300 is described in further detail below with particular reference to FIGS. 3-5.

The hydrocarbon adsorber 500 is preferably located downstream from the air filter element 400 in the clean air portion 440 of the housing. The hydrocarbon adsorber 500 is located within a recess 600 formed in one wall of the first housing member 260 such that the hydrocarbon adsorber is positioned out of the main airflow that passes through the air cleaner assembly 140.

The recess 600 is sized and shaped to fully accommodate the hydrocarbon adsorber 500 therein. When the hydrocarbon adsorber is installed in the recess, an outlet face 510 of the hydrocarbon adsorber is located approximately co-planar (flush) with an inner surface 264 of the first housing member. The hydrocarbon adsorber also has an inlet face 512, which opposes the outlet face. During normal engine operation, when the engine is turned off, the hydrocarbon adsorber 500 adsorbs hydrocarbons that flow upstream through the air cleaner assembly.

Preferably, the hydrocarbon adsorber 500 is attached to first housing member 260 (e.g., by welding, insert molding or permanent snaps) such that it cannot be easily detached. According to one exemplary embodiment, the hydrocarbon adsorber 500 includes a plurality of tabs 530 (e.g., fleece tabs) that can be used to secure it to the first housing member 260 via protrusions such as heat stakes 540 formed in the first housing member.

Preferably, the hydrocarbon adsorber 500 and the unfiltered air port 340 are formed in opposing walls of the air cleaner assembly. According to the illustrated embodiment, recess 600 and the clean air port 320 are both located in the end wall of the first housing member 260 while the unfiltered air port 340 is located in the end wall of the second housing member 280.

Proximate to recess 600, a purge channel 700 is formed in the same wall of the first housing member as the recess. The purge channel 700 extends along an inner wall 610 of the recess and includes an inlet 710 located at an inner surface 264 of the first housing member 260. When a hydrocarbon adsorber is inserted within the recess, the purge channel is in fluid communication with the interior volume 300 of the air cleaner assembly via inlet 710. The purge channel 700 permits air that is flowing through the air cleaner assembly (i.e., into the clean air portion 440) to flow to the inlet face 512 of the hydrocarbon adsorber. By providing the purge channel, when positive air flow is passing through the air cleaner assembly (i.e., from the unfiltered air port to the clean air port) the air flow is directed to the inlet face of the hydrocarbon adsorber such that the direction of airflow through the hydrocarbon adsorber is from the inlet face 512 to the outlet face 510. According to an embodiment, when air flow is being directed into the engine, the direction of air flow through the hydrocarbon adsorber is in a direction opposed to the direction of air flow through the air filter element.

According to the illustrated embodiment, the hydrocarbon adsorber 500 and purge channel inlet are located across from the unfiltered air port 340. Also, the clean air port 320 and the unfiltered air port 340 are formed in opposing end walls of the first and second housing members so as to be offset with respect to each other. With this configuration, at least a portion of the air flowing into the clean air portion 440 of the air cleaner assembly 140 directly impinges on the inlet 710 of the purge channel 700 and flows, via the purge channel, through the hydrocarbon adsorber.

According to the invention, when intake air passes through the air cleaner 140, hydrocarbons trapped in the hydrocarbon adsorber 500 are desorbed and entrained in the intake air such that they are carried downstream into the engine where they are combusted. Thus, the hydrocarbon adsorber 500 can be automatically regenerated during normal engine operation. That is, by providing a purge channel that allows air to flow to the inlet face of the hydrocarbon adsorber, adsorbed hydrocarbons may be easily released (desorbed) from the adsorbent media 520 during normal engine operation. By facilitating flow-through of the hydrocarbon adsorber, the adsorbing media is self-regenerating and does not have to be replaced over the lifetime of the vehicle as a result of hydrocarbon build-up.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

The invention claimed is:

1. An air induction system for an internal combustion engine of a motor vehicle, said system comprising:
an unfiltered air intake,
an air cleaner assembly,
a filtered air duct,
a mass air flow sensor arranged along said filtered air duct for measuring air flow through said air induction system;
a throttle body arranged to regulate air flow through said air induction system, and
a hydrocarbon adsorber positioned in said air induction system for absorbing uncombusted hydrocarbons;
wherein said hydrocarbon adsorber is positioned out of the main airflow that passes through the air induction system, and said air induction system further comprises
a purge channel for directing a portion of the air flow through the air induction system through said hydrocarbon adsorber to purge adsorbed hydrocarbons from said adsorber,
wherein said air cleaner assembly comprises
an air filter housing comprising
a plurality of air filter housing members and
having an air filter element disposed therein with an unfiltered air inlet on one side of the air filter element and a filtered air outlet on the other side of the air filter element,
whereby air from the unfiltered air inlet must flow through the air filter element to reach the filtered air outlet;
said unfiltered air inlet communicating with the unfiltered air intake, and
said filtered air outlet communicating with the filtered air duct,
wherein said hydrocarbon adsorber is disposed in a recess in a wall of one of the air filter housing members downstream of the air filter element.

2. An air induction system according to claim 1, wherein said air filter housing comprises first and second housing members molded from a synthetic resin material and at least one fastener for securing the housing members to each other in a fluid tight manner.

3. An air induction system according to claim 1, wherein said purge channel directs said portion of the air flow to an inlet face of said hydrocarbon adsorber facing the bottom of the recess.

4. An air induction system according to claim 3, wherein said purge channel comprises a purge air inlet arranged in a wall of the air filter housing opposite the unfiltered air inlet and a purge air outlet communicating with the bottom of the recess in which the hydrocarbon adsorber is disposed.

5. An air induction system according to claim 1, wherein said hydrocarbon adsorber is positioned such that an exposed outlet face thereof is approximately co-planar with an inner surface of the air cleaner assembly.

6. An air induction system according to claim 1, wherein the unfiltered air inlet and the filtered air outlet are formed in opposing end walls of the filter housing so as to be offset with respect to each other.

7. An air induction system according to claim 1, wherein said hydrocarbon adsorber is comprised of an adsorbent medium selected from the group consisting of carbon, activated carbon, zeolites, and mixtures thereof.

8. An air induction system according to claim 1, further comprising
a flow conditioning device positioned in the filtered air duct upstream from the mass air flow sensor for reducing turbulence in the air flow.

9. An air induction system according to claim 1, wherein said unfiltered air intake comprises an unfiltered air duct for delivering air to the air cleaner assembly.

10. An air induction system according to claim 1, wherein the throttle body is in fluid communication with an air intake manifold of an internal combustion engine.

11. An air cleaner assembly comprising an air filter housing comprising
a plurality of air filter housing members and
having an air filter element disposed therein with an unfiltered air inlet on one side of the air filter element and a filtered air outlet on the other side of the air filter element,
whereby air from the unfiltered air inlet must flow through the air filter element to reach the filtered air outlet;
said unfiltered air inlet communicating with an unfiltered air intake, and
said filtered air outlet communicating with a filtered air duct; and
a hydrocarbon adsorber positioned in said air cleaner assembly downstream of said air filter element in a clean air portion of said filter housing, said adsorber absorbing uncombusted hydrocarbons;
wherein said hydrocarbon adsorber is positioned out of the main airflow that passes through the air cleaner assembly, and said air cleaner assembly further comprises
a purge channel formed in a wall of said filter housing at a clean air side of said housing and having a purge channel inlet positioned to receive clean air from an outlet face of said filter element and a second end directing said clean air through said hydrocarbon adsorber to purge adsorbed hydrocarbons from said adsorber.

12. An air cleaner assembly comprising an air filter housing comprising:
a plurality of air filter housing members and
having an air filter element disposed therein with an unfiltered air inlet on one side of the air filter element and a filtered air outlet on the other side of the air filter element,
whereby air from the unfiltered air inlet must flow through the air filter element to reach the filtered air outlet;
said unfiltered air inlet communicating with an unfiltered air intake, and
said filtered air outlet communicating with a filtered air duct; and
a hydrocarbon adsorber positioned in said air cleaner assembly for absorbing uncombusted hydrocarbons;
wherein said hydrocarbon adsorber is positioned out of the main airflow that passes through the air cleaner assembly, and said air cleaner assembly further comprises
a purge channel for directing a portion of the air flow through the air cleaner assembly through said hydrocarbon adsorber to purge adsorbed hydrocarbons from said adsorber,
wherein said hydrocarbon adsorber is disposed in a recess in a wall of one of the air filter housing members downstream of the air filter element.

13. An air cleaner assembly according to claim 12, wherein said air filter housing comprises first and second housing members molded from a synthetic resin material and at least one fastener for securing the housing members to each other in a fluid tight manner.

14. An air cleaner assembly according to claim 12, wherein said purge channel directs said portion of the air flow to an inlet face of said hydrocarbon adsorber facing the bottom of the recess.

15. An air cleaner assembly according to claim 14, wherein said purge channel comprises a purge air inlet arranged in a wall of the air filter housing opposite the unfiltered air inlet and a purge air outlet communicating with the bottom of the recess in which the hydrocarbon adsorber is disposed.

16. An air cleaner assembly according to claim 12, wherein said hydrocarbon adsorber is positioned such that an exposed outlet face thereof is approximately co-planar with an inner surface of the air cleaner assembly.

17. An air cleaner assembly according to claim 12, wherein the unfiltered air inlet and the filtered air outlet are formed in opposing end walls of the filter housing so as to be offset with respect to each other.

18. An air cleaner assembly according to claim 12, wherein said hydrocarbon adsorber is comprised of an adsorbent medium selected from the group consisting of carbon, activated carbon, zeolites, and mixtures thereof.

* * * * *